Patented Mar. 13, 1945

2,371,230

UNITED STATES PATENT OFFICE 2,371,230

ART OF OBTAINING STABLE PRODUCTS FROM TALL OIL

Russell G. Dressler, Nutley, N. J., Robert E. Vivian, Los Angeles, Calif., and Torsten Hasselstrom, Savannah, Ga.

No Drawing. Application January 2, 1940, Serial No. 312,158

11 Claims. (Cl. 260—97.5)

This invention pertains to the pre-treatment of tall oil whereby hydrogenation and like treatment thereof is facilitated, and to new and useful products obtained thereby.

Crude tall oil is a by- or waste-product of the sulfate or soda processes of the pulp and paper industry. In general, the term is associated with the sulfate process.

Tall oil is a complex material, the chemical composition of which is litle known. It contains unsaturated fatty acids in simple or polymerized form, liquid and solid resin acids including some identifiable individuals as well as others virtually unknown as to structure, and unsaponifiable matter containing sterols. Any attempted quantitative analysis of the three mentioned principal constituent bodies of tall oil results only in an arbitrary classification. It has been shown that tall oil is a material which is specific in its character and chemical properties, and not to be duplicated by a simple blending of ingredients.

Samples of tall oil vary considerably in composition, with respect to content of resin acids, fatty acids, and unsaponifiable matters. Typical specimens of tall oil as produced in the United States show that crude tall oil may contain from 30 to 65 percent of resin acids, 40 to 60 percent of fatty acids, and up to 10 percent of unsaponifiable matters; while refined and bleached (or distilled) tall oil may contain, for example, from 35 to 40 percent of resin acids, 50 to 60 percent of fatty acids, and up to 10 percent of unsaponifiable matter. Many constituents of tall oil are individually unstable in that they are susceptible to oxidation, etc., and the material is not directly employable for most normal uses of either resin acids or fatty acids. The present procedure has been found advantageous in effecting stabilization of such materials in the crude, semi-refined and refined states. By way of specific example, the materials employed during the work involving the experimental examples set out below had the following characteristics: crude tall oil—33.6 percent resin acids, 56 percent fatty acids, 8.3 percent unsaponifiable matter, iodine number 166 (modified Wijs), thiocyanogen number 74.4, acid number 154, melting point 20 degrees C., sulphur content .08 percent; while the refined and bleached (distilled) tall oil comprised 38.5 percent resin acids, 51 percent fatty acids, 4.6 percent unsaponifiable matter, iodine number 161, thiocyanogen number 64, acid number 164, melting point 19 degrees C., sulphur content .06 percent.

Crude tall oil has found little application in industry due to its black or dark brown color, liquidity, and stickiness, and due to its non-uniformity of chemical composition. The odor is that of pine oil products, along with a distinct smell of mercaptans, and hence is offensive and renders the product unsuitable for general commercial purposes. This material normally appears on the market in a semi-solid state, as a viscous liquid containing varying amounts of suspended solid ingredients, which makes it difficult to handle commercially. The product known to commerce as "distilled tall oil," although it may have been improved somewhat as to color, being orange to brown, still has the disadvantages of being of pine or aromatic odor (with a definite indication of mercaptans), sticky, and non-uniform in physical and chemical composition.

As pointed out in the copending Dressler and Vivian applications, Ser. No. 291,398, of August 22, 1939, and Ser. No. 302,056, of October 30, 1939, the tall oils are very difficult to hydrogenate; and success is not achieved by applying methods commonly used in hydrogenating vegetable oils or fatty acids. Attempts to hydrogenate these tall oils by ordinary means, such as used for hydrogenating cottonseed oil, for example, fail due to the difficulty of hydrogenation because of the nature of the resin acids, and because of the presence of the sulfur-bearing and other accumulated or natural catalytic poisons. It has been found that the crude tall oil is more difficult to hydrogenate than the distilled tall oil, although analyses have shown that their total sulfur contents are practically the same. It would naturally be assumed by persons skilled in the art of hydrogenation that the resistance exhibited by tall oils with respect to hydrogenation is mainly or entirely due to the presence of sulfur-containing substances, for the reason that it is generally agreed that sulfur and its combinations constitute violent poisons to hydrogenation catalysts of nickel and like types. In analysis and studies of the effects of the sulfur content of various types of tall oil, it has been found that substances other than sulfur-containing matters also act as poisons during hydrogenation by means of catalysts.

Even excessive amounts of catalyst, at low pressures or with the use of methods employed in hydrogenating cottonseed oil, do not give success. The required long period of contact (100 hours for example) between the catalyst and the tall oil lead to discoloration and degeneration of the products, and the product has a greenish color, owing to the presence of nickel compounds produced from the catalyst, as well as discoloration from the decomposition and degeneration of tall oil substances, indicating a lessened efficiency of the operation. The materials cannot be commercially employed where a quality material is required, such as in the manufacture of a high grade soap, due to the presence of green nickel soaps and the decomposition products of the tall oil.

It has been found that it is possible to stabilize tall oils and to prepare valuable products therefrom by effecting initial stabilization of resin acid constituents, followed by a hydrogenation operation to substantially effect saturation of the fatty acid constituents. The initial stabilization of the resin acid consituents may be effected, according to this invention, by employment of procedures, including the employment of spent or unspent dehydrogenation catalysts, by which disproportionation is effected in resin acid molecules, whereby, for example, a resin acid of the abietic type having the empiric formula $C_{20}H_{30}O_2$ is caused to yield a product which is found to contain resin acids of the empiric formulas $C_{20}H_{28}O_2$ and $C_{20}H_{32}O_2$, and having superior resistance to oxidation and other effects, apparently because the individual product resin acids have internal structures differing from those of the initial unstable resin acid.

It has further been found that this stabilization of the resin acid components can also be accomplished conjointly with a reduction of the resistance of other tall oil components to hydrogenation, by way of reduction or elimination of the effects of the catalyst poisons which limit the procedures of hydrogenation of the unsaturated fatty acids, for example; and further, this disproportionation treatment of itself appears to have a valuable influence upon the course of the hydrogenation, by way of elimination of some of the restricting effects apparently induced by steric hindrance in double bonds of resin acid components as originally present.

Thus the resistance of tall oils to hydrogenation may be reduced by pre-treatment by means of disproportionating procedures with or without auxiliary use of natural or activated adsorbent clays and earths or like adsorbent matters such as carbons, by means of metals such as nickel in the form of shavings or by means of spent or unspent hydrogenation catalysts including those which are capable of effecting disproportionation through dehydrogenation and/or hydrogenation of the original rosin acid molecule, either directly or while the tall oil is dissolved or extended in a suitable solvent in which the adsorbent is suspended.

Experience has shown that dark-colored tall oils are not significantly bleached by bleaching clays, activated carbons, simple adsorbents or simple catalysts when the treatment is carried out according to the prevailing methods of bleaching proposed for vegetable fats and oils. However, the action of such substances in provoking a removal or immunization of catalytic poisons from tall oils is highly advantageous as a preliminary to hydrogenation thereof.

The following examples indicate typical treatments according to this invention.

*Example I*

1500 grams of crude tall oil were heated at 180 to 240 degrees C. with 30 grams of powdered nickel. The content of resin acids of the empiric formula $C_{20}H_{30}O_2$ is thus caused to decrease, and after 2 hours treatment at 180 to 200 degrees C. about 4 percent of the total resin acids (and about 8 percent upon heating for 2 hours at 180 to 200 degrees C. and then 2 hours at 240 degrees C.) have an empiric formula $C_{20}H_{28}O_2$, and likewise resin acids of empiric formula $C_{20}H_{32}O_2$ are now present: these latter two groups of acids having a greatly improved stability over the initial $C_{20}H_{30}O_2$ resin acids and serving to render the total content of resin acids far less responsive to penetration of other atoms such as occurs by oxidation, hydrogenation, etc. The tall oil was decanted to separate it from the powdered nickel, and was then subjected to hydrogenation four times at 200 pounds hydrogen pressure for one-half hour each at 180 degrees C., using one-half percent of nickel in finely divided form as a catalyst each time and filtering off spent catalyst before adding the fresh catalyst. The product was a satisfactory hydrogenated tall oil having a melting point of approximately 38 degrees C.

The nickel powder can then be immediately utilized for a further treatment of additional tall oil. A less finely divided nickel, such as nickel shavings or shot may be employed, but greater relative quantities, even as high as 1000 grams of nickel shot per thousand grams of crude or refined tall oil are desirable. It is usually preferred to insure uniformity of treatment by an agitating operation such as shaking or stirring; in which event a lesser proportion of catalyst is effective. When large surfaces are exposed, it is preferred to protect the surfaces of the material undergoing this pre-treatment by utilization of a non-oxidizing atmosphere such as carbon dioxide, nitrogen or the rare gases which are particularly advantageous where a maximum conversion to dehydrogenated resin acids such as $C_{20}H_{28}O_2$ is to be effected, as these atmospheres are in themselves non-hydrogenating.

It is likewise possible to employ spent or unspent hydrogenating catalysts, such as finely divided nickel or nickel distributed on a carrier for accomplishing this pretreatment: platinum, palladium and cobalt, as examples of other hydrogenating catalysts, may likewise be employed.

*Example II*

1500 grams of a typical crude tall oil are mixed with 50 grams of an active black bleaching clay such as is used for vegetable oils. This mixture is heated to and maintained at 180 to 200 degrees C., and agitated by stirring for a period of two hours, while a non-oxidizing atmosphere (carbon dioxide or nitrogen) is maintained in contact therewith. As in Example I, the initial resin acids have been stabilized by disproportionation, and about two percent of $C_{20}H_{28}O_2$ resin acids are present. (When the heating is continued for 2 hours more at 240 degrees C., about 7 percent thereof are present.) The tall oil is filtered free from the clay and the material adsorbed therein, and is found to be substantially unchanged in color. This pre-treated and filtered tall oil is hydrogenated three times at 200 pounds hydrogen pressure and at 180 degrees C. for time intervals of ½ hour each, each time employing ½ percent of fresh nickel catalyst, filtering off the spent catalyst before adding the fresh portion. The hydrogenated tall oil is a solid of light color and has a melting point of 35 degrees C., with thiocyanogen number 55 as compared with the viscous liquid nature of the original crude tall oil at 20 degrees C.

Example IIa 1500 grams of crude tall oil were mixed with 50 grams of Norite (a commercially available carbon bleaching and filtering material) and heated to and maintained at 180 to 200 degrees C., with agitation by stirring, for two hours. As before, precaution was taken against oxidation. The proportion of $C_{20}H_{28}O_2$ resin acids was approximately 2.5 percent. (When the heating was continued for two hours more at 240 degrees C., about 3 percent were present). The tall oil was filtered free from the bleaching compound, and was then subjected to hydrogenation as in Example II. The melting point of the hydrogenated tall oil was about 37 degrees C.

It will be noted that the several examples lead to a product in which the resin acids have been doubly subjected to stabilization; on the one hand by disproportionation so that acids of the $C_{20}H_{28}O_2$ group are formed, and on the other hand by hydrogenation of other relatively unsaturated acids. Owing to the relative stability of the $C_{20}H_{28}O_2$ acids formed by disproportionation, very little of this component is modified during the later hydrogenation, and a characteristic of the final material is its content of from 1 to 25 percent of $C_{20}H_{28}O_2$ (dehydroabietic) acids.

Example III 1500 grams of crude tall oil were heated to 180 to 200 degrees C., and 30 grams of spent nickel catalyst were added. The mixture was kept at 180 to 200 degrees C. for two hours. As before, the initial resin acids have been stabilized by disproportionation, and about one percent of $C_{20}H_{28}O_2$ resin acids are present. (When the heating is continued for 2 hours more at 240 degrees C., the product contains 6 percent of such acids.) The mixture was then hydrogenated four times at 200 pounds hydrogen pressure for ½ hour each at 180 degrees C., using ½ percent of nickel as a catalyst each time, and filtering off spent catalyst before adding the fresh catalyst. The product was a satisfactory hydrogenated tall oil having a melting point of 37 degrees C.

Unspent nickel catalyst, and spent or unspent palladium, platinum and cobalt catalysts, with or without carriers, can be similarly employed.

Example IV 1500 grams of crude tall oil were heated to about 180 degrees C. and 30 grams of nickel dust or other catalyst of Example III were added. The mixture was kept at 180 to 240 degrees C. for four hours. It was permitted to cool and was left standing at room temperature for 2 to 10 days until about 10 to 45 percent of the solids had settled out. This solid matter was removed by filtration, and contained 12 percent of the $C_{20}H_{28}O_2$ acid. The liquid part was subjected to hydrogenation, utilizing three hydrogenating treatments of ½ hour each at 180 degrees C. with ½ percent of nickel as a catalyst each time. The resulting hydrogenated tall oil was a solid having a melting point of 41 degrees C.

Such pre-treatments with disproportionation catalyst are preferably accomplished at temperatures in excess of 100 degrees C., and for a period of at least fifteen minutes, to obtain at least a partial disproportionation of hydrogen in at least one sensitive molecule as a preliminary operation. Disproportionation action appears to begin even with as little as one one-hundredth of a percent of catalyst.

Example V 200 grams of the same crude tall oil treated as in Example IV were dissolved in 1000 grams of cleaner's naphtha, heated to 110 degrees C. and held at this temperature for five minutes. The liquid phase was then filtered, and subjected to steam distillation to remove the solvent. The product was then hydrogenated as in Example III. The resulting material had a melting point of 29 degrees C. This pre-treatment led to a type of purification, but did not lead to the high melting point of the treatment according to Example III, thus indicating the advantage of the pre-treatment with clay or like adsorbent.

As stated, it has been found that the catalyst itself may be employed as a pre-treating agent. When a large quantity, such as 10 or 20 percent of the nickel or like catalyst is agitated with the crude tall oil, at a temperature of 180 to 240 degrees C., a similar purification is effected, although no substantial hydrogenation of resin acid constituents is accomplished even though hydrogen atmosphere is employed to prevent deterioration of the tall oil. Upon separating the spent nickel material, fresh nickel is introduced in minor percentage, as set out above, and hydrogenation can then be regularly effected with the production of a material of increased melting point.

A temperature of 240 degrees C. should not be exceeded, as destructive distillation effects at higher temperatures lead to extensive losses by decarboxylation.

It is not necessary, however, to employ fresh catalyst for such purposes, as it has been found that the spent catalyst from a hydrogenation treatment is still capable of effecting a pre-treatment by way of disproportionation and to increase the rate of hydrogenation of fatty acid constituents after such pre-treatment.

Further, mixtures of the various adsorbent matters and catalysts have been found to be effective for the pre-treatment.

The examples include illustrations of the feasibility of accomplishing a purification for reducing the poisoning effects, conjointly with a modification of the original material, as the catalyst (specifically nickel for example) not only are effective to cause dehydrogenation and hydrogenation of the radicals of the original resin acids through disproportionation of the hydrogen present in the rosin acid molecules, for example, but also are capable of acting for reduction or elimination of the mercaptans and other sulfur-containing poisonous compounds, as well as other catalytic poisons, so that the pre-treated product, ready for hydrogenation, may comprise a mixture of ingredients having lesser hydrogen content than the original resin acids, with ingredients having a greater hydrogen content. Such disproportionations usually proceed by changes in the resin acid molecules or like bodies present, so that the material being hydrogenated no longer has its resin acid content in the same chemical form as in the crude tall oil: and it has been found that such a pre-treatment is highly effective for improving the characteristics of the final hydrogenated tall oil with respect to color, odor, resistance to oxidation, etc., and without requiring actual hydrogenation of all resin acids.

Further, it is feasible to accomplish the pretreatment by mixtures of bleaching clay or like adsorbents, together with a metallic catalyst (such as nickel), and thereby an effective purification from poisons, as well as the disproportionation, can be effected to the extent that the hydrogenation requires a lesser number of treatments to attain a desired melting point of the final material.

According to the present process of converting tall oils by hydrogenation, commercially valuable, new and useful products have been obtained which upon tests, both physically and chemically, have been found to exhibit desirable qualities. The hydrogenated products are of much lighter and improved color, of increased stability, practically odorless, free from stickiness, physically homogeneous, and exceedingly more uniform in composition. In particular, it has been found that even a slight actual hydrogenation of the unsaturated fatty acids which are present in admixture with fixed or stabilized resin acids in the pre-treated material, is advantageous, as the product is less subject to oxidation; this result being due to the elimination of high unsaturates from the composition, as indicated by the changes in stability and odor.

It is preferred to conduct the hydrogenation to effect the elimination of substantially all the fatty acids having less hydrogen than the formula $C_nH_{2n-2}O_2$, so that the product contains only fatty acids of the $C_nH_{2n-2}O_2$ (oleic) and $C_nH_{2n}O_2$ (stearic) groups: and this hydrogenation may effectively be continued until even the $C_nH_{2n-2}O_2$ group has been substantially saturated. The precise choice as to the termination point can be fixed by commercial considerations of the relative value of the products at the successive levels of hydrogenation. Such hydrogenation also, of course, leads to partial or complete saturation of the resin abietic acids of the $C_{20}H_{30}O_2$ group which were originally present; and to a decrease of unsaturation of other components (such as certain unsaponifiables) originally present.

Differing conditions of times, temperatures, and pressures permit controlling the hydrogenation process as to degree of saturation desired. Conditions favorable to a higher degree of saturation during the hydrogenation operation comprise a longer time of hydrogenation, a larger proportion of catalyst, and higher hydrogen pressures. Both the physical and chemical properties of hydrogenated tall oil products depend on the degree of saturation, and tall oil products of different degrees of saturation may be used for different commercial purposes. For example, in manufacturing liquid soaps, a product of low hydrogenation with a melting point of about 25 degrees C. is preferable; while for manufacture of a high-titre laundry soap, a hydrogenated tall oil product of melting point 50 degrees C. is preferable.

For best results in hydrogenating tall oils, an intimate and quick mixing of catalyst, tall oil and hydrogen is necessary to prevent deterioration of the catalyst with time of contact. When tall oil or hydrogenated tall oil products are in a hot melted state, they are best kept in an inert atmosphere, to prevent gradual darkening of color. Any suitable non-oxidizing and non-halogenating atmosphere may be used for this purpose, such as hydrogen, carbon dioxide, nitrogen, or the rare gaseous elements. Similarly, such atmospheres are preferably employed during the pre-treatment.

Studies of the mechanism and course of the reaction, and analysis of the original tall oils and of the hydrogenated products, indicate that both the resin acids and the fatty acids undergo change due to a full or partial saturation of the unsaturated bonds or rearrangement of the same during the disproportionation.

These new stabilized and hydrogenated products are capable of extensive use in industries requiring material of this nature, such as those engaged in the manufacture of soaps, rubber, greases and lubricants, etc. The product has valuable physical and chemical properties, as compared with the initial materials, in addition to its relative cheapness. It can, of course, be used advantageously to replace ordinary tall oil in its crude or unrefined condition, with the advantages of the higher melting point, lower unsaturation and great stability of the hydrogenated material.

The hydrogenated products are characterized by their fatty nature which allows them to be used in processing industries where fatty materials are now used. Thus, they may be used to replace commercial oleic and stearic acids and other vegetable and animal oils and fats in soaps, textile dressings, etc.

It has been found that poisoning of the catalyst occurs rapidly, and is usually complete within an hour in laboratory practice: in commercial practice, a somewhat longer time is sometimes endured by the catalyst, corresponding to the usual rate of hydrogenation itself, but poisoning occurs and the several reactions show typical graphs which are similar in laboratory and commercial practice. Hence, it is desirable to subject the material to temperature and pressure immediately upon mixing with the catalyst; and to carry on the reaction rapidly, which is possible when high pressures are used. The reaction rate is of great importance, and the actual time of contact with the gas is a lesser consideration, because after the catalyst is poisoned, no appreciable reaction occurs regardless of the time of running; and the reaction can be stimulated only by the use of fresh catalyst. This reaction involves the tall oil, the catalyst, and hydrogen; and a greater quantity of hydrogen present produces a greater effective concentration of the hydrogen at the catalytic surfaces and increases the reaction rate. On the other hand, poisoning of the catalyst occurs principally between the tall oil (including its impurities) and the catalyst, that is, between a liquid and a solid, and there is no gaseous phase involved and therefore high pressures do not appreciably increase the rate of poisoning reactions; nor does the hydrogen itself appear to play any substantial part in the rate of such poisoning.

Thus, it is presently preferred to employ pressures of the order of 200 to 600 pounds, during the hydrogenation; although commercially economical results have been obtained by the use of pressures from 50 to 2500 pounds, and even lower pressures are feasible if due precautions are taken against side reactions arising from the usually longer times for hydrogenation at the lower pressures. For economy in equipment costs, 2500 pounds pressure presently appear as an upper limit of operating pressures.

It has been particularly noted that the presence of poisoned catalyst appears quickly to inactivate fresh catalyst, and hence spent catalyst should be separated before fresh is added. However, even this spent catalyst has been found valuable for a pre-treatment to effect the presence of poisons in the initial matter.

The various hydrogenating catalysts can be employed. Among the catalysts which have been found effective are finely divided nickel, nickel deposited on diatomaceous earth, and nickel with copper as a co-catalyst, together with platinum, palladium, and nickel with other metals as co-catalysts or accelerators or promoters.

It is obvious that the invention is not limited to the specific examples shown, but that the process may be practiced and products obtained under other conditions within the scope of the appended claims.

We claim:

1. The method of preparing from tall oil a stable product containing resin acid and fatty acid components in essentially the proportion occurring in the original material, which consists in heating the tall oil in the presence of a disproportionation catalyst at a temperature of 100 to 240 degrees C. until at least one per cent of resin acids of the formula $C_{20}H_{28}O_2$ are produced and essentially in the absence of hydrogenation and decarboxylation of resin acid components, removing the disproportionation catalyst from the treated tall oil, and thereafter hydrogenating the treated tall oil under heat and pressure and in the presence of a hydrogenating catalyst.

2. The method of preparing from tall oil a stable product containing resin acid and fatty acid components in essentially the proportion occurring in the original material, which consists in heating the tall oil in the presence of a disproportionation catalyst at a temperature of 100 to 240 degrees C. for a period of 15 minutes to 6 hours until at least one per cent of resin acids of the formula $C_{20}H_{28}O_2$ are produced and essentially in the absence of hydrogenation and decarboxylation of resin acid components, removing the disproportionation catalyst from the treated tall oil, and thereafter hydrogenating the entire treated tall oil under heat and pressure and in the presence of a hydrogenating catalyst.

3. The method of producing from tall oil a stable product containing fatty acid and resin acid components in essentially the proportion occurring in the original material, which comprises heating the tall oil to a temperature of 150 to 240 degrees C. in the presence of a disproportionation catalyst for 15 minutes to 6 hours and essentially in the absence of hydrogenation and decarboxylation of resin acid components, removing the disproportionation catalyst and thereafter rapidly hydrogenating the treated tall oil under heat and pressure and in the presence of successive quantities of finely divided nickel, removing said nickel each time before adding a fresh quantity.

4. The method of producing from crude tall oil a stable product containing fatty acid and resin acid components in essentially the proportion occurring in the original material, which comprises heating the crude tall oil to a temperature of 150 to 240 degrees C. in the presence of a disproportionation catalyst for 15 minutes to 6 hours and essentially in the absence of hydrogenation and decarboxylation of resin acid components, removing the disproportionation catalyst, and thereafter hydrogenating the treated tall oil under heat and pressure and in the presence of successive quantities of hydrogenation catalyst, removing each quantity of catalyst each time before adding a fresh quantity, and continuing said hydrogenation until the fatty acids containing a lesser amount of hydrogen than the formula $C_nH_{2n-2}O_2$ are substantially eliminated and the product has a melting point of the order of 35 degrees C.

5. The method of preparing crude tall oil for obtaining a product capable of rapid hydrogenation and containing fatty acid and resin acid components in essentially the proportion occurring in the original material, which consists in heating the tall oil in the presence of a disproportionation catalyst at a temperature of 100 to 240 degrees C. for a period of at least 2 hours and until at least one per cent of resin acids of the formula $C_{20}H_{28}O_2$ are produced, and removing the catalyst.

6. The method of preparing crude tall oil for obtaining a product capable of hydrogenation and containing fatty acid and resin acid components in essentially the proportion occurring in the original material, which consists in heating the tall oil in the presence of a disproportionation catalyst and under an inert atmosphere at substantially atmospheric pressure at a temperature of 150 to 240 degrees C. for a period of 15 minutes to 6 hours until at least one per cent of resin acids of the formula $C_{20}H_{28}O_2$ are produced and essentially in the absence of hydrogenation and decarboxylation of resin acid components, and removing the catalyst.

7. The method of producing from tall oil a stable product containing fatty acid and resin acid components, which comprises heating the tall oil to a temperature of 150 to 240 degrees C. in the presence of finely divided nickel for 15 minutes to 6 hours and essentially in the absence of hydrogenation and decarboxylation of resin acid components, separating the nickel and thereafter hydrogenating the treated tall oil under heat and pressure and in the presence of a hydrogenating catalyst.

8. The method of producing from tall oil a stable product containing fatty acid and resin acid components, which comprises heating the tall oil to a temperature of 150 to 240 degrees C. in the presence of bleaching clay for 15 minutes to 6 hours until at least one per cent of resin acids of the formula $C_{20}H_{28}O_2$ are produced and essentially in the absence of hydrogenation and decarboxylation of resin acid components, separating the clay, and thereafter hydrogenating the treated tall oil under heat and pressure and in the presence of a hydrogenation catalyst.

9. A stable tall oil product characterized in containing from 1 to 25 percent of $C_{20}H_{28}O_2$ resin acids together with $C_{20}H_{32}O_2$ resin acids and fatty acids, the resin acids being present essentially in the proportion of the resin acids occurring in the original material, having a melting point in excess of 25 degrees C., having a light color, and being substantially free of mercaptan and pine odors and from stickiness, and being substantially free of unsaturated fatty acids having relatively less hydrogen than the formula $C_nH_{2n-2}O_2$, and being stable against oxidation under atmospheric conditions.

10. A stable tall oil product characterized in containing from 1 to 25 percent of $C_{20}H_{28}O_2$ resin acids together with $C_{20}H_{32}O_2$ resin acids and fatty acids, the resin acids being present essentially in the proportion of the resin acids occurring in the original material, in having a melting point of at least 35 degrees C., a thiocyanogen number below 60, and being substantially free of mercaptan and pine odors and being a solid of light yellow color, and being stable against oxidation under atmospheric conditions.

11. A stable resin and fatty acid material produced from crude tall oil by successive disproportionation and hydrogenation, characterized in containing resin and fatty acids and non-saponifiable matters in essentially the relative molecular proportion thereof as in crude tall oil, the resin acid component including at least two percent of stable $C_{20}H_{30}O_2$ resin acids and also including hydrogenated resin acids, the product being essentially free of oxidizable resin acids and of unsaturated fatty acids having relatively less hydrogen than the formula $C_nH_{2n-2}O_2$, said product having a melting point in excess of 25 degrees C., having a light color, and being substantially free of mercaptan and pine odors and from stickiness.

RUSSELL G. DRESSLER.
ROBERT E. VIVIAN.
TORSTEN HASSELSTROM.